Patented Aug. 3, 1943

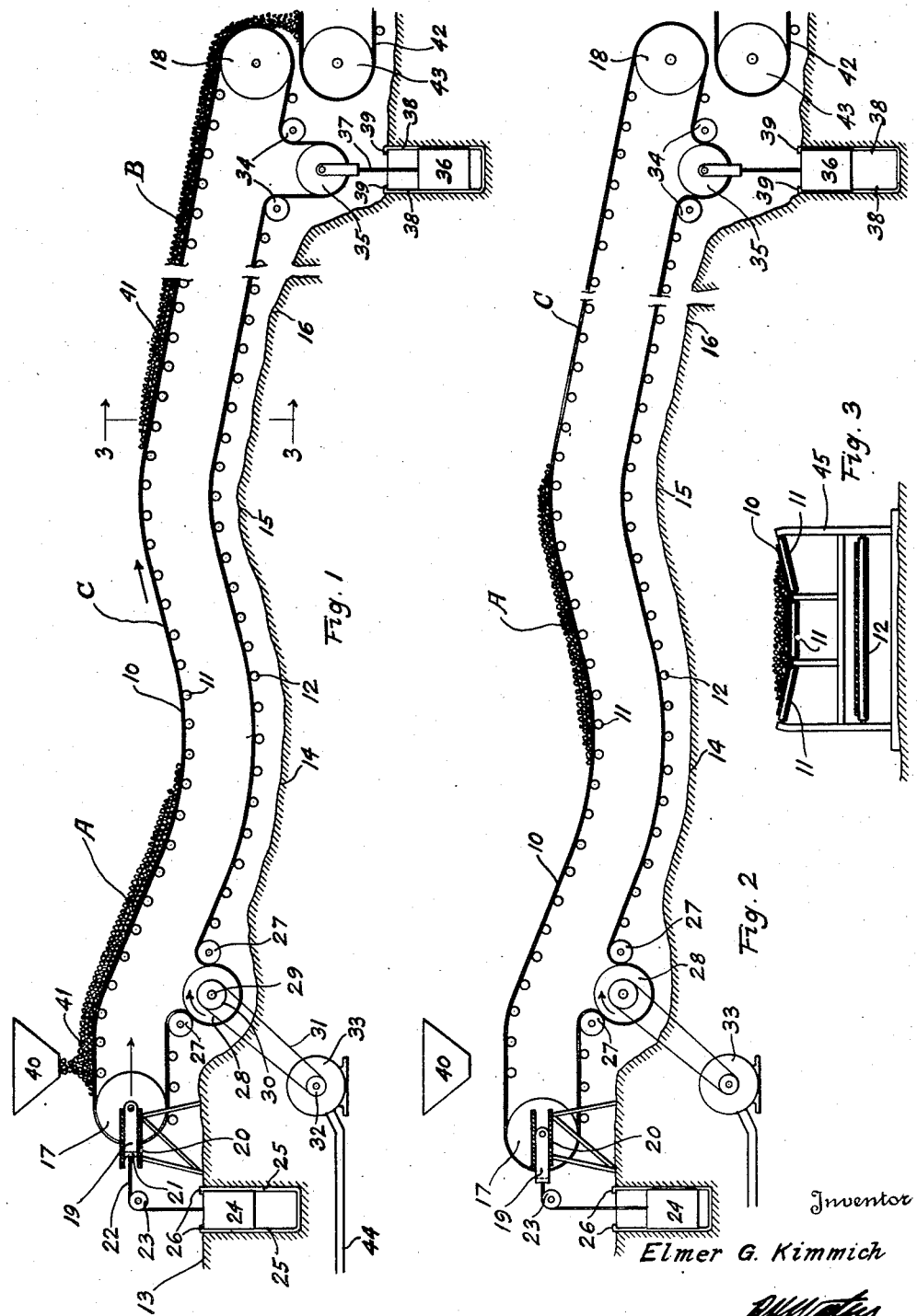

2,326,098

UNITED STATES PATENT OFFICE 2,326,098

CONVEYER SYSTEM

Elmer G. Kimmich, Akron, Ohio, assignor to Wingfoot Corporation, Akron, Ohio, a corporation of Delaware Application August 2, 1940, Serial No. 350,029

5 Claims. (Cl. 198—208)

The present invention relates to belt conveyer systems and the like and has particular reference to the means for regulating the tension of a conveyer belt used in such a system.

One object of this invention is to provide belt-tensioning means of a character to maintain the proper tension in the belt irrespective of whether the belt is a driven or a driving belt, all as will be hereinafter more fully explained in the description.

A further object of this invention is to provide belt-tensioning means suitable for conveyers which have the runs of the belt and particularly the load-carrying run thereof extending in a serpentine manner, such as is necessary to carry material over irregular terrain.

Other objects of this invention will appear hereinafter as the description thereof proceeds, the various features, arrangements and combinations being clearly set forth in the specification and in the claims thereunto appended.

In the drawing

Fig. 1 is a schematic view illustrating the invention in one phase of operation;

Fig. 2 is a similar view showing the invention in another phase of operation; and Fig. 3 is a section taken substantially along the line 3—3 of Fig. 1 showing somewhat diagrammatically the manner in which the upper and lower runs of the conveyer are supported.

Conveyer belts are now being used to convey material such as rock, coal, limestone and the like for great distances over irregular terrain from a source of supply to a point where the material is to be used, thus doing away with the necessity of hauling the material by trucks, trains and the like. Some of these installations cover a distance of ten miles or more and use a series of belts for conveying the material that distance. In such an installation one belt deposits the material onto a second belt etc., so as to keep a constant flow of material from the source of supply to the point at which the material is to be deposited. Some of the individual belts employed are mounted on pulleys spaced as much as a mile apart and, due to irregularities in the terrain, the course of the belts is rather irregular and resembles somewhat a roller-coaster in appearance, having numerous points at which the belt runs at a positive slope or grade and others at which it runs at a negative slope or grade. To regulate the tension in such belts is a serious problem for reasons which will appear hereinafter.

In Fig. 1 I have illustrated schematically a belt 10 carried by an upper set of rollers 11 and a lower set of rollers 12 suitably spaced so that the belt will not sag materially in between rollers. The belt is illustrated as being mounted to convey material over rough terrain, starting from the point of supply at 13 through a depression 14, then over a raised portion of ground 15 and subsequently down the slope 16. It is to be understood that this is merely schematic and illustrates but one condition confronted in the mounting of the conveyer belt. This construction is used so as not to require the filling in of ground in the low spots or the cutting away of ground in the high spots and to avoid the necessity of mounting some of the rollers on stilts, as would be necessary if the conveyer were to be given a constant slope as is common in the use of most conveyer belts of this character.

The conveyer belt is trained over a head pulley 17 and a tail pulley 18 mounted in any suitable type of bearings so that they will be free to rotate. As shown in Fig. 1 the head pulley 17 is mounted on a pair of sliding blocks 19 (only one of which is shown) which slide in suitable bearings such as 20 and are connected by a cross member 21 to which is fastened a cable 22 trained over a pulley 23 carrying a counterweight 24, here shown as sliding vertically in suitable guides 25, having stops 26 which limit the upward movement of the counterweight. The lower run of the belt is trained over a pair of guiding pulleys 27 and a driving pulley 28. The driving pulley 28 is mounted on a shaft 29 carrying a pulley 30 and a belt 31 trained over the pulley 30 and a pulley 32 on a motor-generator set 33 is used to drive the pulley 28 in the direction indicated by the arrow in Fig. 1.

The lower run of the belt near the tail pulley 18 is trained over the guiding pulleys 34 and around a pulley 35 carrying a counterweight 36 connected thereto by cable 37. The counterweight 36 is guided by suitable guides 38 provided with stops 39 to limit the upward movement of the counterweight. A hopper 40 receives the material as from a crusher and deposits the material 41 on the upper run of the belt as the belt moves from left to right. The tail end of the belt (at the right in Fig. 1) deposits the material on a second conveyer belt 42 trained over the head pulley 43 and this second conveyer belt will convey the material to another point where it is either deposited or discharged onto another conveyer. It is to be understood that the invention is equally applicable to a single conveyer wherein the material is not deposited on a second conveyer as illustrated in the drawing, but in most installations there is apt to be more than one conveyer belt, as it is found to be more convenient, especially when a change of direction in a horizontal plane is necessary.

Suitable electrical conductors 44 are used to carry the current to or from the motor generator set 33, as the case may be, because as will hereinafter be described the belt 10 sometimes acts as a driving belt and at other times acts as a driven belt. When the belt is being driven, current is fed to the motor-generator set through the conductors 44 to drive the motor generator and this in turn causes a driving of the belt 10. When the belt is acting as a driving member the motor generator set is driven through the connections described, thus generating electricity which is conducted through the conductors 44 or another set of conductors to a point where the electricity is either stored or used. No claim is herein made to a motor-generator set operating as herein described, except in conjunction with the particular set-up herein shown and claimed. The generator acts as a power brake to regulate the speed of the belt when the belt is the driving member.

The operation of the device is as follows. In Fig. 1 it will be noted that the material 41 on the conveyer is located on the downwardly sloping portions A and B thereof. This loading of the conveyer results in a condition which causes the conveyer to act as a driving belt, since the load tends to move the conveyer in the direction indicated by the arrows. Under such a condition the pull at the upper left in Fig. 1 causes the pulley 17 to be moved to the right and the weight 24 to be moved upwardly against the stops 26 where this weight remains during the driving of the conveyer by the material mounted thereon. The slack in the lower run of the conveyer is taken up by means of the counterweight 36 at the tail end of the conveyer and this counterweight also keeps a sufficient tension in the upper run of the conveyer at the right-hand end thereof to keep the material from causing a sagging of the belt between supporting rollers 11, as it is important at all times to keep the load-supporting surface relatively taut. During this operation of the conveyer the motor generator set is acting as a generator to generate electricity which may be stored or immediately used as the conditions require. It also acts as a brake to prevent the belt from running too fast.

The portion C of the conveyer illustrated in Fig. 1 is shown as not having any material supported thereon, and such a void is caused usually by the fact that during the time the portion C was passing under the hopper 40 no material was being discharged from the hopper. If, at the instant the conveyer is loaded, as illustrated in Fig. 1, the hopper 40 should be empty and no material were discharged onto the conveyer thereafter for a period of time, the conveyer would continue to move forward until the load on section A of the belt has moved forward to the position illustrated in Fig. 2, at which time the load on the portion B of the belt in Fig. 1 has been discharged onto the conveyer 42. With such a loading on the belt, it will be noted that power will be required to drive the belt, since the material is moving up on a positive grade and therefore the motor-generator set acts as a motor to drive the belt, thus pulling on the lower run of the conveyer belt and causing the counterweight 36 to move upwardly against the stops 39 so that in effect the counterweight 36 is thrown out of the system. This makes the upper run of the belt at the left-hand end thereof somewhat slack, but this slack is taken up by the counterweight 24 so as to keep the upper run of the conveyer sufficiently taut for the purposes described.

The motor generator set is provided with suitable devices for changing its characteristics as the characteristics of the conveyer belt change and these changes in the characteristics of the conveyer belt are apt to change quite rapidly under certain circumstances, but such rapid changes are automatically taken care of by the mechanism just described, and the load-carrying surface or upper run of the conveyer belt is always maintained sufficiently taut to prevent sagging of the conveyer belt between rollers.

With a counterweight sufficiently heavy for tensioning the upper run of the conveyer belt at all times, whether the conveyor belt is the driven or driving member, the weight of such a single counterweight would have to be considerably more than the two counterweights used in a construction such as is shown in the drawing for, in order to take up the slack, it would have to pull through the driving connection for the belt comprising the pulley 28 etc. Thus, if a single counterweight were used, as at 36 in Fig. 2, in order to tension the upper left-hand end of the conveyer belt, it would be necessary that the weight 36 be, not only heavy enough to tension the lower end of the upper run, but also sufficiently heavy to overcome the resistance of the driving unit and have sufficient effective weight left over to tension the upper left-hand end of the conveyer belt.

By using two counterweights the total pull on the belt as the result of these counterweights is considerably less than would be necessary if one counterweight were employed, thus the belt itself will last longer due to the fact that there is less strain on the conveyer belt, or the conveyer belt could be made of lighter construction to accomplish the same result, and thus materially reduce the cost of the conveyer belt. Note also that any one portion of the conveyer belt is subject only to the tension induced by one of the counterweights 24 or 36, plus some small portion of the weight of the other counterweight, which may react through the long length of the belt to that portion acted on by the first counterweight. This fact has been established very conclusively on installations which have actually been made. Briefly summarized, the invention comprises the use of at least two counterweights arranged to tension the belt at opposite sides of the power-driving or driven unit and these counterweights alternately act to take up the slack in the conveyer belt, depending upon whether the conveyer belt is the driven or the driving member.

In Fig. 3 I have illustrated diagrammatically the upper run of the belt 10 as being supported longitudinally by a series of three rollers 11 mounted in suitable bearings in a frame-work 45. The outer ones of these rollers 11 are arranged at an angle to raise the outer edges of the belt to provide a trough in which the material will ride. The lower run of the belt is shown as supported by the rollers 12, also mounted in suitable bearings in the framework 45. This construction shown in Fig. 3 is merely illustrative of the manner in which the conveyer may be supported and therefore I do not wish to be limited in the particular manner of supporting a conveyer embodying this invention, as any other means may be employed to suit the requirements.

Obviously those skilled in the art to which this invention pertains may make various changes in the particular arrangement and construction of the parts without departing from the spirit of the invention and, therefore, I do not wish to be limited in my invention except as may be hereinafter set forth in the claims.

Having thus fully described my invention, what I claim and desire to secure by Letters Patent of the United States is:

1. Conveying mechanism comprising an endless conveyer, roller means directly supporting a load-receiving run thereof with a substantially undulating surface in a longitudinal direction, head and tail pulleys over which the conveyer is trained, power driving-means for driving said conveyer, and separately acting conveyer tensioning means arranged at different sides of the driving means and between said driving means and the load-carrying run of said conveyer, one of said tensioning means acting to move the head pulley to tension the conveyer at that end, and the other of said tensioning means being arranged to tension the non-load-supporting portion of the conveyer near the tail end thereof when the load on said conveyer is such as to drive said conveyer, said motor acting as a brake in such case to retard the conveyer movement.

2. Conveying mechanism comprising an endless conveyer having a load supporting run thereof with a longitudinally undulating load supporting surface, with at least certain stretches thereof moving along a positive grade and other stretches thereof moving along a negative grade, power driving means for driving said conveyer, said power driving means acting to brake the forward movement of the conveyer when the load on said conveyer is such as to overrun the power driving means to drive said conveyer, separately acting conveyer tensioning means arranged at opposite sides of said driving means and between said driving means and the load carrying run of said conveyer, one of which means acts on a portion of the belt between the driving means and the load receiving end of the load supporting run of the belt and the other of which acts on a portion of the belt between the power driving means and the load discharging end of the load supporting run, and separate stops for limiting the movement of the respective tensioning means when the drive is through that tensioning means.

3. Conveying mechanism comprising an endless conveyer having a load supporting run thereof with a longitudinally undulating load supporting surface, with at least certain stretches thereof moving along a positive grade and other stretches thereof moving along a negative grade, motor generator means for driving said conveyer when the load is moving up a positive grade and for braking the forward movement of the conveyer when the load on said conveyer is moving down a negative grade, and separately acting conveyer tensioning means arranged at opposite sides of said motor generator means and between said motor generator means and the load carrying run of said conveyer, one of which means acts on a portion of the belt between the motor generator means and the load receiving end of the load supporting run of the belt and the other of which acts on a portion of the belt between the motor generator means and the load discharging end of the load supporting run.

4. A conveyor system including an endless conveyer belt, rollers directly supporting the upper stretch of the belt so that part of the stretch is on a positive grade and part of the stretch is on a negative grade, a head and a tail pulley about which the belt extends, a drive pulley associated with the lower stretch of the belt adjacent the head pulley, rollers holding a portion of the lower stretch of the belt in contact with more than 180 degrees of driving surface of the drive pulley, means tending to move the head pulley horizontally to tension the belt, stop means limiting both the right and left horizontal movement of the head pulley, an idler tension pulley associated with the lower stretch of the belt adjacent the tail pulley, means tending to move the idler tension pulley at right angles to the lower stretch of the belt to tension the belt, and stop means limiting both the upper and lower vertical movement of the idler tension pulley.

5. A cross country conveyer system including an endless conveyer belt of a strength to both support and drive the load applied thereon, a head and tail pulley over which the belt is trained, rolls directly supporting the upper run of the belt for movement both uphill and down, a drive pulley associated with the lower run of the belt, means for driving the drive pulley to drive the belt, means for tensioning the belt adjacent the head pulley, means limiting the movement of the tensioning means, other means for tensioning the belt adjacent the tail pulley, and means limiting the movement of the last-named tensioning means.

ELMER G. KIMMICH.